United States Patent
Asaoka et al.

(10) Patent No.: US 10,180,172 B2
(45) Date of Patent: Jan. 15, 2019

(54) MANUFACTURING METHOD FOR SHOCK ABSORBER

(71) Applicant: KYB Corporation, Tokyo (JP)

(72) Inventors: Shotaro Asaoka, Gifu (JP); Tsutomu Ozeki, Gifu (JP)

(73) Assignee: KYB Corporation, Tokyo (JP)

( * ) Notice: Subject to any disclaimer, the term of this patent is extended or adjusted under 35 U.S.C. 154(b) by 326 days.

(21) Appl. No.: 15/123,317

(22) PCT Filed: Mar. 17, 2015

(86) PCT No.: PCT/JP2015/057922
§ 371 (c)(1),
(2) Date: Sep. 2, 2016

(87) PCT Pub. No.: WO2015/146722
PCT Pub. Date: Oct. 1, 2015

(65) Prior Publication Data
US 2017/0067528 A1    Mar. 9, 2017

(30) Foreign Application Priority Data
Mar. 25, 2014  (JP) .................. 2014-061626

(51) Int. Cl.
| | |
|---|---|
| *F16F 9/54* | (2006.01) |
| *F16F 9/32* | (2006.01) |
| *B60G 13/00* | (2006.01) |
| B60G 13/06 | (2006.01) |
| F16F 9/19 | (2006.01) |

(52) U.S. Cl.
CPC .............. *F16F 9/54* (2013.01); *B60G 13/003* (2013.01); *F16F 9/32* (2013.01); *F16F 9/3271* (2013.01); *B60G 13/06* (2013.01); *B60G 2204/128* (2013.01); *B60G 2206/82092* (2013.01); *F16F 9/19* (2013.01); *F16F 2226/045* (2013.01); *F16F 2230/0005* (2013.01)

(58) Field of Classification Search
CPC ........ F16F 9/54; F16F 9/32; F16F 2230/0005; F16F 9/19; F16F 2226/045; B60G 13/003; B60G 2204/128; B60G 13/06; B60G 2206/82092
See application file for complete search history.

(56) References Cited

U.S. PATENT DOCUMENTS 2,645,846 A * 7/1953 Thompson .............. B23P 19/02
29/244
2010/0275434 A1* 11/2010 Fuse ........................ B21L 9/065
29/525

FOREIGN PATENT DOCUMENTS

| CN | 102615623 A | 8/2012 |
|---|---|---|
| JP | H07-35839 U | 7/1995 |

* cited by examiner

*Primary Examiner* — David Bryant
*Assistant Examiner* — Christine Bersabal
(74) *Attorney, Agent, or Firm* — Rabin & Berdo, P.C.

(57) ABSTRACT

A rotation lock is provided to a piston rod, a collar is fitted on a small-diameter portion disposed on an end portion on a side of the piston rod extending from a cylinder, and the collar is press-fitted onto a press-fitted portion disposed on the piston rod by a press-fitting jig screwed with an external thread formed on the small-diameter portion. The press-fitting jig adds an axial force to the collar.

4 Claims, 3 Drawing Sheets

FIRST STEP    SECOND STEP    THIRD STEP

MANUFACTURING METHOD FOR SHOCK ABSORBER

TECHNICAL FIELD

The present invention relates to a manufacturing method for a shock absorber.

BACKGROUND ART

JP7-35839U discloses a structure to mount a shock absorber on a vehicle via a mount member. The mount member and the shock absorber are connected by a nut, which is screwed with an end portion of a piston rod, and a collar, which is secured by press-fitting on the piston rod, sandwiching the mount member.

SUMMARY OF INVENTION

For a shock absorber with a collar secured by press-fitting on a piston rod, there may be a case where the collar is not allowed to be press-fitted onto the piston rod until the assembly of the shock absorber completes.

A method for press-fitting the collar onto the piston rod in this case possibly press-fits the collar in a state where the piston rod does not move axially by holding an outer peripheral surface of the piston rod with a facility.

However, the above method may have a possibility that the piston rod slides axially to cause a press-fitting failure, or damage the piston rod.

It is an object of the present invention to achieve performing press-fitting a collar onto a piston rod easily after completing assembly of a shock absorber.

According to one aspect of the present invention, a manufacturing method for manufacturing a shock absorber with a collar secured by press-fitting on a piston rod extending from a cylinder includes a step of providing a rotation lock to the piston rod, a step of fitting the collar on a small-diameter portion disposed on an end portion on a side of the piston rod extending from the cylinder, and a step of press-fitting the collar onto a press-fitted portion disposed on the piston rod by a press-fitting jig screwed with an external thread formed on the small-diameter portion, the press-fitting jig adding an axial force to the collar.

DESCRIPTION OF EMBODIMENTS

The following describes a shock absorber 100 according to an embodiment of the present invention with reference to the attached drawings.

Figure 1:
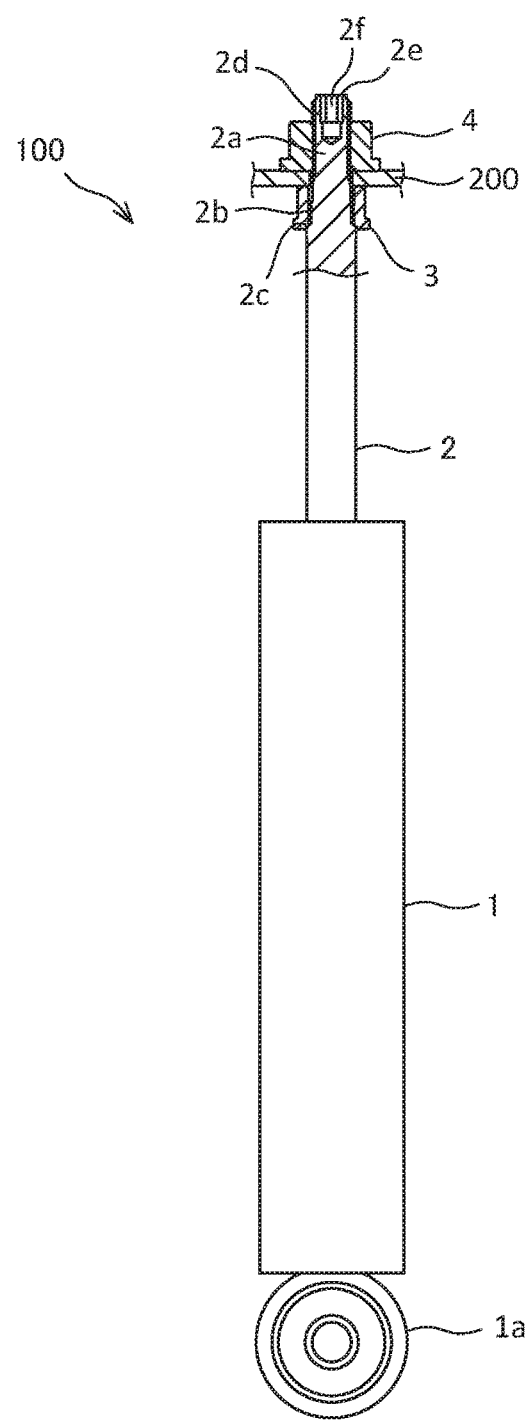
FIG. 1 is a partial cross-sectional view illustrating a shock absorber according to an embodiment of the present invention.

The shock absorber 100 is, for example, a device interposed between a vehicle body and an axle shaft of a vehicle (not illustrated) to reduce a vibration of the vehicle body by generating a damping force, and as illustrated in FIG. 1, one end is mounted on the vehicle via a mount member 200 connected to an end portion of a piston rod 2, which extends from a cylinder 1. The other end of the shock absorber 100 is mounted on the vehicle by a mounting member 1a disposed on the cylinder 1.

The piston rod 2 is inserted in the cylinder 1 so as to advance and retreat freely. The piston rod 2 includes a small-diameter portion 2a, a press-fitted portion 2b, and a stepped portion 2c, which are disposed at the end portion on a side extending from the cylinder 1. The small-diameter portion 2a is formed with an external thread 2d. The press-fitted portion 2b is press-fitted with a collar 3, and a position of the collar 3 in the axial direction of the piston rod 2 is specified by contacting on the stepped portion 2c.

The shock absorber 100 and the mount member 200 are connected by fastening a nut 4 in the external thread 2d of the piston rod 2 in a state where the mount member 200 is fitted on the small-diameter portion 2a of the piston rod 2, and is placed on the collar 3.

Here, the piston rod 2 is rotatable in the circumferential direction with respect to the cylinder 1. For example, while the nut 4 is fastened in the external thread 2d by holding the cylinder 1, a fastening torque of the nut 4 fails to increase up to the specified torque if the piston rod 2 rotates together with the nut 4.

In view of this, a hexagonal hole 2f is disposed on an end surface 2e on the side of the piston rod 2 extending from the cylinder 1 in order to engage a tool in the hexagonal hole 2f to provide a rotation lock to the piston rod 2 while the nut 4 is fastened.

Next, a manufacturing method for the shock absorber 100 according to the embodiment of the present invention will be described.

As described above, the collar 3 is secured by press-fitting on the piston rod 2 of the shock absorber 100.

For the shock absorber including such a collar, there may be a case where the collar is not allowed to be press-fitted onto the piston rod until the assembly of the shock absorber completes.

A method for press-fitting the collar onto the piston rod in this case possibly press-fits the collar in a state where the piston rod does not move axially by holding an outer peripheral surface of the piston rod with a facility.

However, the above method may have a possibility that the piston rod slides axially to cause a press-fitting failure, or damage the piston rod.

Figure 2:
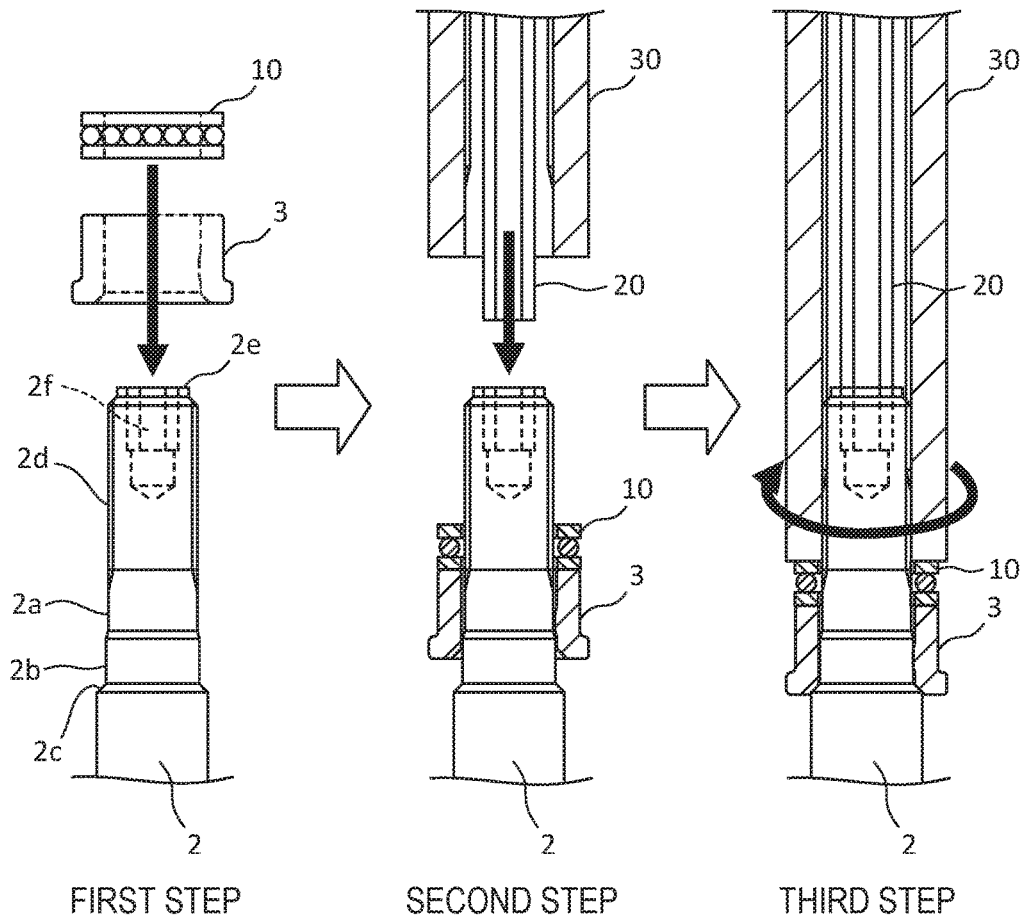
FIG. 2 is a diagram describing a manufacturing method for the shock absorber according to the embodiment of the present invention.

Therefore, in this embodiment, by a method illustrated in FIG. 2, press-fitting the collar 3 can be performed easily even in a case where the collar 3 is press-fitted onto the piston rod 2 after completing assembly of the shock absorber 100.

First, at a first step, the collar 3 and a thrust bearing 10 are fitted on the small-diameter portion 2a of the piston rod 2 in a state where the cylinder 1 of the shock absorber 100, which has completed the assembly with the piston rod 2 inserted in the cylinder 1, is held.

Next, at a second step, the hexagonal hole 2f of the piston rod 2 is engaged with a rotation locking jig 20, and the rotation lock is provided to the piston rod 2. Thus, using the hexagonal hole 2f disposed for fastening the nut 4 can provide the rotation lock to the piston rod 2 without disposing an additional engaging portion.

At a third step, the external thread 2d of the piston rod 2 is screwed with a press-fitting jig 30 that is formed with an internal thread on the inner circumferential surface, in a state where the piston rod 2 is provided with the rotation lock. Then, as the press-fitting jig 30 rotates, the press-fitting jig 30 and the thrust bearing 10 contact to add an axial force from the press-fitting jig 30 to the collar 3 via the thrust bearing 10, thereby the collar 3 is press-fitted onto the press-fitted portion 2b of the piston rod 2.

According to this, press-fitting the collar 3 can be performed easily without the piston rod 2 moving axially to cause a press-fitting failure, or damage the piston rod 2.

If the press-fitting jig 30 and the collar 3 contact directly at this time, a friction of the contacting portion between the press-fitting jig 30 and the collar 3 increases the rotating torque required to rotate the press-fitting jig 30.

In contrast to this, in this embodiment, the thrust bearing 10 is arranged between the press-fitting jig 30 and the collar 3 so as to inhibit the increase of the rotating torque of the press-fitting jig 30. Accordingly, a motor that rotates the press-fitting jig 30 can be downsized.

Inhibiting the increase of the rotating torque of the press-fitting jig 30 can prevent damaging to the external thread 2d of the piston rod 2.

The contacting portion between the thrust bearing 10 and the collar 3 does not generate sliding, therefore a surface of the collar 3 that contacts the thrust bearing 10, that is, a surface that contacts the mount member 200, can be prevented from being damaged.

At the third step, as soon as the press-fitting jig 30 contacts the thrust bearing 10, press-fitting the collar 3 starts and the rotating torque required to rotate the press-fitting jig 30 increases. Then, upon completing press-fitting with the collar 3 contacting the stepped portion 2c of the piston rod 2, the rotating torque required to rotate the press-fitting jig 30 increases even larger.

Here, the number of rotations required additionally for the press-fitting jig 30 until completing press-fitting the collar 3 can be determined in designing manner by setting a position of the press-fitting jig 30, when the press-fitting jig 30 and the thrust bearing 10 contact, as a reference position.

Accordingly, in this embodiment, by setting the position of the press-fitting jig 30 when the press-fitting jig 30 and the thrust bearing 10 contact, that is, a position of the press-fitting jig 30 when the rotating torque first increases, as a reference, then the press-fitting state of the collar 3 is determined on the basis of the number of rotations of the press-fitting jig 30 from the reference position and a transition of the rotating torque of the press-fitting jig 30.

Subsequently, the collar 3 according to the embodiment of the present invention will be described.

Figure 3:
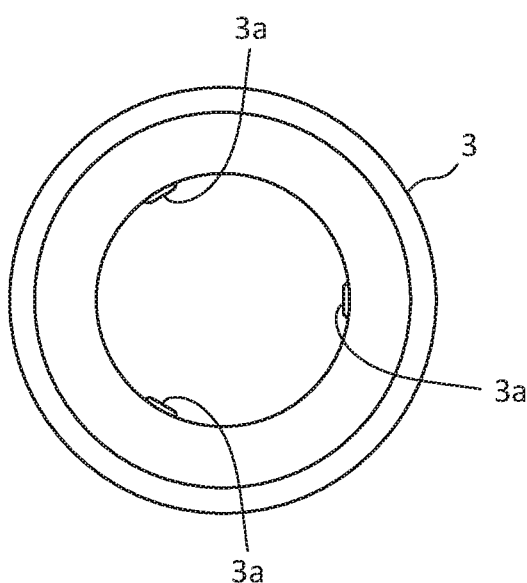
FIG. 3 is a top view of a collar according to the embodiment of the present invention.

The collar 3 includes convex portions 3a disposed at three positions in the circumferential direction in the inner circumferential surface as illustrated in FIG. 3.

The convex portion 3a is formed to have an interference with the press-fitted portion 2b of the piston rod 2. That is, the collar 3 is press-fitted using the convex portions 3a to the press-fitted portion 2b.

This ensures a load required to press-fit the collar 3 to be decreased, and the axial force added from the press-fitting jig 30 to the collar 3 to be decreased, compared with a case where the whole inner circumferential surface of the collar 3 has the interference with the press-fitted portion 2b of the piston rod 2. Accordingly, the rotating torque of the press-fitting jig 30 can be decreased, and the motor that rotates the press-fitting jig 30 can be downsized.

The decreased rotating torque of the press-fitting jig 30 can prevent damaging the external thread 2d of the piston rod 2.

The decreased axial force added from the press-fitting jig 30 to the collar 3 can improve a durability of the thrust bearing 10.

As described above, according to the embodiment, press-fitting the collar 3 can be performed easily without the piston rod 2 moving axially to cause a press-fitting failure, or damage the piston rod 2, because the collar 3 is press-fitted onto the press-fitted portion 2b of the piston rod 2 by adding the axial force from the press-fitting jig 30, which is screwed with the external thread 2d of the piston rod 2, to the collar 3.

The rotation lock of the piston rod 2 during press-fitting the collar 3 is provided using the hexagonal hole 2f, which is disposed on the end surface 2e of the piston rod 2 for fastening the nut 4, therefore it is not necessary to dispose an additional engaging portion on the piston rod 2.

Arranging the thrust bearing 10 between the press-fitting jig 30 and the collar 3 can inhibit the increase of the rotating torque of the press-fitting jig 30. Accordingly, the motor that rotates the press-fitting jig 30 can be downsized.

Inhibiting the increase of the rotating torque of the press-fitting jig 30 can prevent damaging to the external thread 2d of the piston rod 2.

The contacting portion between the thrust bearing 10 and the collar 3 does not generate sliding, therefore a surface of the collar 3 that contacts the thrust bearing 10, that is, a surface that contacts the mount member 200, can be prevented from being damaged.

The collar 3 is press-fitted onto the press-fitted portion 2b of the piston rod 2 using the convex portions 3a disposed on the inner circumferential surface, therefore the load required to press-fit can be decreased, and the axial force added from the press-fitting jig 30 to the collar 3 can be decreased, compared with the case where the whole inner circumferential surface of the collar 3 has the interference with the press-fitted portion 2b. Accordingly, the rotating torque of the press-fitting jig 30 can be decreased, and the motor that rotates the press-fitting jig 30 can be downsized.

The decreased rotating torque of the press-fitting jig 30 can prevent damaging the external thread 2d of the piston rod 2.

The decreased axial force added from the press-fitting jig 30 to the collar 3 can improve the durability of the thrust bearing 10.

Embodiments of the present invention were described above, but the above embodiments are merely examples of applications of the present invention, and the technical scope of the present invention is not limited to the specific constitutions of the above embodiments.

For example, in the above-described embodiment, a shape of the engaging portion that provides the rotation lock to the piston rod 2 is the hexagonal hole 2f, however, it may be a width across flat, a groove shape, or similar shape. The engaging portion may be disposed on the outer peripheral surface of the piston rod 2, in addition to the hexagonal hole 2f.

As illustrated in FIG. 2, the rotation lock is provided to the piston rod 2 after fitting the collar 3 and the thrust bearing 10 onto the piston rod 2, however, in a case where the engaging portion is disposed on the outer peripheral surface of the piston rod 2 as described above to engage the rotation locking jig from the side surface of the piston rod 2, the rotation lock may be provided to the piston rod 2 before fitting the collar 3 and the thrust bearing 10 on the piston rod 2.

Although the thrust bearing 10 is arranged between the press-fitting jig 30 and the collar 3, press-fitting the collar 3 may be performed without using the thrust bearing 10.

The press-fitting state of the collar 3 is determined on the basis of the number of rotation and the rotating torque of the press-fitting jig 30, however, instead of the number of rotation of the press-fitting jig 30, a stroke in the axial direction of the press-fitting jig 30 may be used, or an operating time of the press-fitting jig 30 may be used.

Although the convex portions 3a of the collar 3 are disposed at three positions, the number of the convex portion 3a can be set arbitrarily.

With respect to the above description, the contents of application No. 2014-61626, with a filing date of Mar. 25, 2014 in Japan, are incorporated herein by reference.

The invention claimed is:

1. A manufacturing method for manufacturing a shock absorber with a collar secured by press-fitting on a piston rod extending from a cylinder, comprising:
    a step of providing a rotation lock to the piston rod by engaging a rotation locking jig in an engaging portion disposed on an end surface on a side of the piston rod extending from the cylinder;
    a step of fitting the collar on a small-diameter portion disposed on an end portion on the side of the piston rod extending from the cylinder;
    and a step of press-fitting the collar onto a press-fitted portion disposed on the piston rod by a press-fitting jig screwed with an external thread formed on the small-diameter portion, the press-fitting jig adding an axial force to the collar, and the rotation locking jig preventing rotation of the piston rod during the press-fitting step.

2. The manufacturing method for the shock absorber according to claim 1, wherein
    the collar is press-fitted onto the press-fitted portion of the piston rod using a plurality of convex portions disposed in a circumferential direction on an inner circumferential surface, the plurality of convex portions having interferences with the press-fitted portion of the piston rod.

3. The manufacturing method for the shock absorber according to claim 1, further comprising
    a step of determining a press-fitting state of the collar on the basis of a count of rotation of the press-fitting jig and a rotating torque of the press-fitting jig.

4. The manufacturing method for the shock absorber according to claim 1, wherein
    a thrust bearing is arranged between the press-fitting jig and the collar, and the axial force is added from the press-fitting jig to the collar via the thrust bearing.

* * * * *